April 26, 1955 W. STOGNER 2,706,870
AERATED MINNOW BUCKET
Filed Feb. 23, 1954
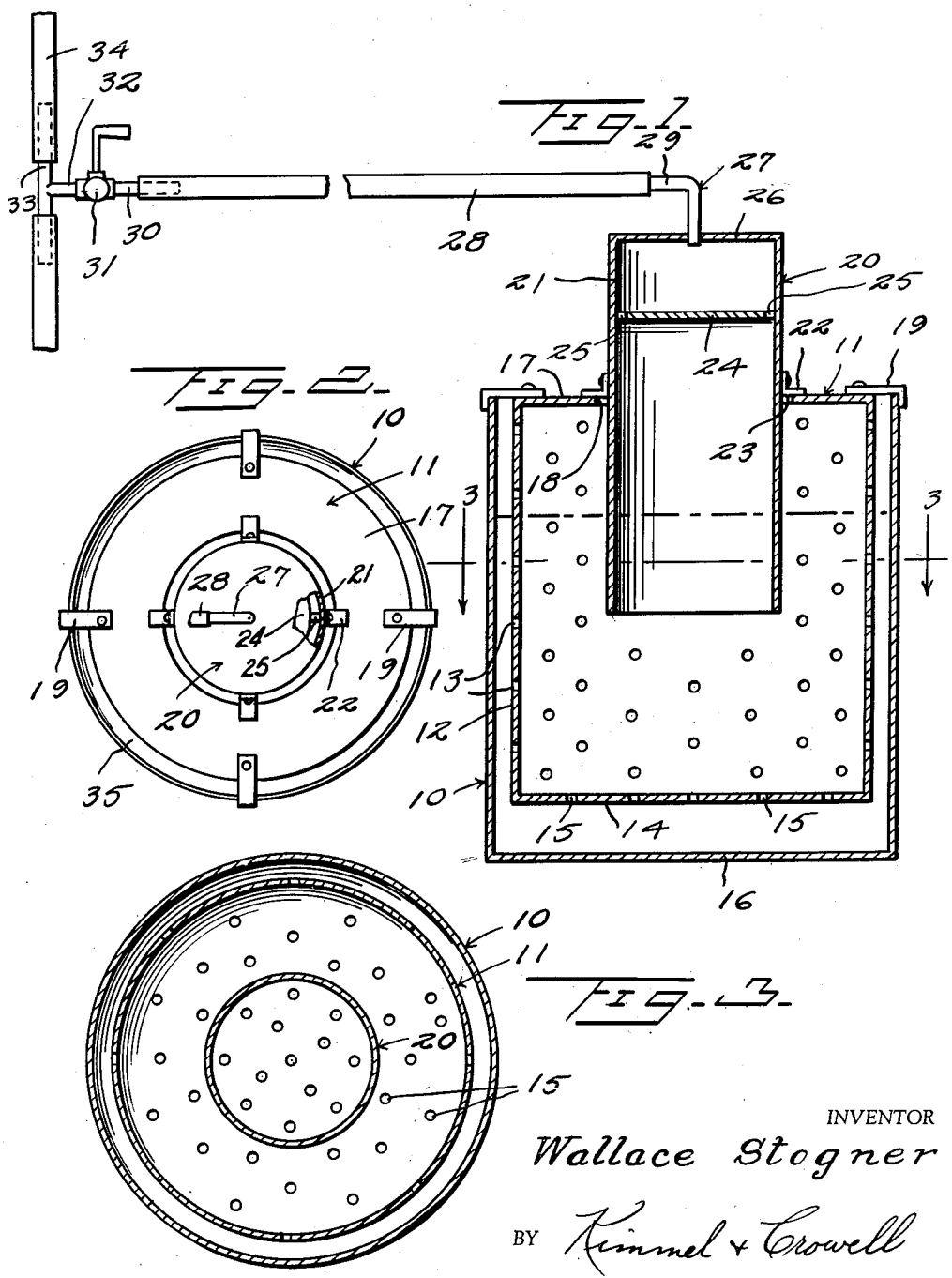
INVENTOR
Wallace Stogner
BY Kimmel + Crowell
ATTORNEYS

United States Patent Office 2,706,870
Patented Apr. 26, 1955

2,706,870

AERATED MINNOW BUCKET

Wallace Stogner, Lamesa, Tex.

Application February 23, 1954, Serial No. 411,641

1 Claim. (Cl. 43—56)

This invention relates to a minnow bucket and means for aerating the same.

An object of this invention is to provide an improved minnow bucket which is adapted to be connected to the suction line of a windshield wiper whereby air bubbles will be produced in the water in a minnow bucket so that the live minnows will receive ample air and will not die due to exhaustion of air in the water.

Another object of this invention is to provide an improved minnow bucket embodying an outer receptacle or bucket, an inner perforated receptacle within which the minnows are placed, with an inverted aerating member removably supported in the center of the inner receptacle and depending in the water, with a suction line extending from the aerating member to a vehicle suction line, such as a suction line to a windshield wiper.

With the above and other objects in view, my invention consists in the arrangement, combination and details of construction disclosed in the drawing and specification, and then more particularly pointed out in the appended claim.

In the drawing:

Figure 1 is a vertical section of a minnow bucket and aerating means therefor, constructed according to an embodiment of this invention.

Figure 2 is a plan view, partially broken away, of the device.

Figure 3 is a sectional view taken on the line 3—3 of Figure 1.

Referring to the drawing, the numeral 10 designates generally an outer bucket which is adapted to contain a quantity of water. The outer bucket 10 has suspended therein a perforated minnow receptacle 11. The receptacle 11 is formed of a cylindrical side wall 12 having a plurality of openings 13 with a bottom wall 14 also having openings 15.

The bottom wall 14 of the minnow receptacle 11 is spaced upwardly from the bottom wall 16 of the outer bucket or receptacle 10. The inner receptacle 11 has secured to the upper end of side wall 12, a top wall 17 having a central relatively large opening 18.

The inner receptacle 11 is provided with a plurality of outwardly projecting L-shaped supporting bars 19 engaging over the rim or upper edge of the outer receptacle 10 for removably suspending the inner receptacle 11 within the outer bucket 10. In order to provide a means whereby the water contained in the two receptacles 10 and 11 may be aerated so that the minnows will not die because of lack of air, I have provided an inverted suction member generally indicated at 20.

The suction member 20 is formed of an imperforate cylindrical side wall 21 provided with a plurality of supporting angle members 22 between the upper and lower ends thereof which are engageable on the upper side of the top wall 17 for disposing a substantial portion of the suction member 20 within the inner receptacle 11.

The supporting members 22 also include lugs 23 which engage the marginal edge of the opening 18 for centrally holding the suction member 20 in the top wall 17.

A disk shaped baffle 24 having a diameter slightly less than the inner diameter of the side wall 21 is secured within the suction member 20 by means of radially extending lugs 25. The suction member 20 also includes a top wall 26 which has secured in the center thereof a tubular connection 27 of L-shape.

A flexible suction hose 28 telescopes over the horizontal side 29 of the connection 27 and also telescopes over a nipple 30 extending from a valve 31. The valve 31 has connected to the opposite side thereof a T-shaped coupling 32 which has the oppositely extending branches 33 interposed in a flexible suction line 34.

The suction line 34 is preferably the conventional suction line leading from the carburetor of an engine to a servo motor operating a windshield wiper.

In the use of this minnow bucket, the minnows are placed through the central opening 18 in the inner bucket 11. At this time the inverted suction member 20 will be removed from the top wall 17. A quantity of water will be placed in the outer receptacle 10 so that the level of the water will be above the open lower end of the suction member 20.

When valve 31 is opened, a quantity of water will be drawn upwardly into suction member 20, and at this time air will be drawn through the space 35 between the outer and inner receptacles and through the openings 13.

This incoming air will bubble through the water and will pass upwardly into the interior of suction member 20. As the bubbles pass through the water in the receptacle 10 the water will retain a quantity of the air in the bubbles so that the water in the receptacle 10 will have sufficient air to sustain life in the minnows.

With an aerated minnow bucket or receptacle as hereinbefore described, the minnows will live for a relatively long period of time and a greater number of minnows may be placed in the inner receptacle than has heretofore been possible.

What is claimed is:

An aerated minnow bucket comprising an outer receptacle open at the top and adapted to receive water, an inner receptacle having perforate side and bottom walls and a top wall formed with a central opening, means suspending said inner receptacle in said outer receptacle, a suction member formed of an imperforate cylindrical side wall and a top wall, means removably supporting said suction member through said central opening with a substantial portion of the latter named said side wall depending in said inner receptacle and immersed in the water, a horizontally disposed baffle plate fixed to said latter named side wall above said inner receptacle, and portions of the edge of said baffle plate being spaced from said side wall to allow for passage of air between said plate and said side wall, and tubular means connected with said top wall adapted for connection to a suction source.

References Cited in the file of this patent

UNITED STATES PATENTS

| 1,451,925 | Ruff | Apr. 17, 1923 |
| 2,007,326 | Carpenter | July 9, 1935 |
| 2,573,109 | Renfro | Oct. 30, 1951 |
| 2,590,376 | Campbell | Mar. 25, 1952 |
| 2,594,172 | Hoffman et al. | Apr. 22, 1952 |